US011579788B2

(12) United States Patent
Mitchel et al.

(10) Patent No.: US 11,579,788 B2
(45) Date of Patent: *Feb. 14, 2023

(54) TECHNOLOGIES FOR PROVIDING SHARED MEMORY FOR ACCELERATOR SLEDS

(71) Applicant: Intel Corporation, Santa Clara, CA (US)

(72) Inventors: Henry Mitchel, Wayne, NJ (US); Joe Grecco, Saddle Brook, NJ (US); Sujoy Sen, Portland, OR (US); Francesc Guim Bernat, Barcelona (ES); Susanne M. Balle, Hudson, NH (US); Evan Custodio, Seekonk, MA (US); Paul Dormitzer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/943,221

(22) Filed: Jul. 30, 2020

(65) Prior Publication Data

US 2020/0356294 A1    Nov. 12, 2020

Related U.S. Application Data

(63) Continuation of application No. 15/721,825, filed on Sep. 30, 2017, now Pat. No. 10,768,842.

(Continued)

(30) Foreign Application Priority Data

Aug. 30, 2017  (IN) .............................. 201741030632

(51) Int. Cl.
*G06F 3/06* (2006.01)
*G06F 16/174* (2019.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ........ G06F 9/5044; G06F 9/5055; G06F 9/50; G06F 9/5016; G06F 13/1652;
(Continued)

(56) References Cited

U.S. PATENT DOCUMENTS 7,921,264 B2    4/2011  Bartley et al.
2008/0140932 A1    6/2008  Flynn et al.
(Continued)

OTHER PUBLICATIONS

D. Syrivelis et al., "A software-defined architecture and prototype for disaggregated memory rack scale systems," 2017 International Conference on Embedded Computer Systems: Architectures, Modeling, and Simulation (SAMOS), Aug. 30, 2017, pp. 300-307. (Year: 2017).*

(Continued)

*Primary Examiner* — Khoa D Doan
(74) *Attorney, Agent, or Firm* — Compass IP Law PC

(57) ABSTRACT

Technologies for providing shared memory for accelerator sleds includes an accelerator sled to receive, with a memory controller, a memory access request from an accelerator device to access a region of memory. The request is to identify the region of memory with a logical address. Additionally, the accelerator sled is to determine from a map of logical addresses and associated physical address, the physical address associated with the region of memory. In addition, the accelerator sled is to route the memory access request to a memory device associated with the determined physical address.

27 Claims, 19 Drawing Sheets

Related U.S. Application Data

(60) Provisional application No. 62/427,268, filed on Nov. 29, 2016.

(51) Int. Cl.

| | |
|---|---|
| G06F 21/57 | (2013.01) |
| G06F 21/73 | (2013.01) |
| G06F 8/65 | (2018.01) |
| H04L 41/0816 | (2022.01) |
| H04L 41/0853 | (2022.01) |
| H04L 41/12 | (2022.01) |
| H04L 67/10 | (2022.01) |
| G06F 11/30 | (2006.01) |
| G06F 9/50 | (2006.01) |
| H01R 13/453 | (2006.01) |
| G06F 9/48 | (2006.01) |
| G06F 9/455 | (2018.01) |
| H05K 7/14 | (2006.01) |
| H04L 61/5007 | (2022.01) |
| H04L 67/63 | (2022.01) |
| H04L 67/75 | (2022.01) |
| H03M 7/30 | (2006.01) |
| H03M 7/40 | (2006.01) |
| H04L 43/08 | (2022.01) |
| H04L 47/20 | (2022.01) |
| H04L 47/2441 | (2022.01) |
| G06F 11/07 | (2006.01) |
| G06F 11/34 | (2006.01) |
| G06F 7/06 | (2006.01) |
| G06T 9/00 | (2006.01) |
| H03M 7/42 | (2006.01) |
| H04L 12/28 | (2006.01) |
| H04L 12/46 | (2006.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 41/044 | (2022.01) |
| H04L 49/104 | (2022.01) |
| H04L 43/04 | (2022.01) |
| H04L 43/06 | (2022.01) |
| H04L 43/0894 | (2022.01) |
| G06F 9/38 | (2018.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| H04L 67/1014 | (2022.01) |
| G06F 8/656 | (2018.01) |
| G06F 8/658 | (2018.01) |
| G06F 8/654 | (2018.01) |
| G06F 9/4401 | (2018.01) |
| H01R 13/631 | (2006.01) |
| H04L 47/78 | (2022.01) |
| G06F 16/28 | (2019.01) |
| H04Q 11/00 | (2006.01) |
| G06F 11/14 | (2006.01) |
| H04L 41/046 | (2022.01) |
| H04L 41/0896 | (2022.01) |
| H04L 41/142 | (2022.01) |
| H04L 9/40 | (2022.01) |
| G06F 15/80 | (2006.01) |

(52) U.S. Cl.
CPC .......... *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/5005* (2013.01); *G06F 9/505* (2013.01); *G06F 9/5038* (2013.01); *G06F 9/5044* (2013.01); *G06F 9/5083* (2013.01); *G06F 9/544* (2013.01); *G06F 11/0709* (2013.01); *G06F 11/079* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/5007* (2022.05); *H04L 67/10* (2013.01); *H04L 67/1014* (2013.01); *H04L 67/63* (2022.05); *H04L 67/75* (2022.05); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01); *H04Q 11/0005* (2013.01); *H05K 7/1447* (2013.01); *H05K 7/1492* (2013.01)

(58) Field of Classification Search
CPC .... G06F 3/0641; G06F 3/0604; G06F 3/0608;

G06F 3/0611; G06F 3/0613; G06F 3/0617; G06F 3/0647; G06F 3/065; G06F 3/0653; G06F 3/067

See application file for complete search history.

(56) References Cited

U.S. PATENT DOCUMENTS

| | | |
|---|---|---|
| 2009/0006706 A1 | 1/2009 | Bartley et al. |
| 2009/0006781 A1 | 1/2009 | Bartley et al. |
| 2010/0312962 A1 | 12/2010 | DeKoning et al. |
| 2013/0151725 A1 | 6/2013 | Baginski et al. |
| 2014/0089572 A1* | 3/2014 | Koka .................. G06F 12/1072 711/147 |
| 2014/0325211 A1 | 10/2014 | Stransky |
| 2014/0372679 A1 | 12/2014 | Flynn et al. |
| 2015/0052276 A1 | 2/2015 | Klughart |
| 2015/0178191 A1 | 6/2015 | Camp et al. |
| 2016/0306553 A1 | 10/2016 | Ellis et al. |

OTHER PUBLICATIONS

R. Ammendola et al., "Virtual-to-Physical address translation for an FPGA-based interconnect with host and GPU remote DMA capabilities," 2013 International Conference on Field-Programmable Technology (FPT), 2013, pp. 58-65, doi: 10.1109/FPT.2013.6718331. (Year: 2013).*

Andrew Putnam, A reconfigurable fabric for accelerating large-scale datacenter services, 2014 ACM/IEEE 41st International Symposium on Computer Architecture (ISCA) (pp. 13-24). (Year 2014).

Final Office Action for U.S. Appl. No. 15/721,825, dated Mar. 31, 2020, 25 pages.

Office Action for U.S. Appl. No. 15/721,825, dated Dec. 27, 2019, 28 pages.

* cited by examiner

TECHNOLOGIES FOR PROVIDING SHARED MEMORY FOR ACCELERATOR SLEDS

CROSS-REFERENCE TO RELATED APPLICATIONS

The present application is a continuation of U.S. patent application Ser. No 15/721,825, which was filed Sep. 30, 2017 and which claims the benefit of U.S. Provisional Patent Application No. 62/427,268, filed Nov. 29, 2016 and Indian Provisional Patent Application No. 201741030632, filed Aug. 30, 2017.

BACKGROUND

Use of accelerator devices, such as field-programmable gate arrays (FPGAs), in data centers is increasing to a point where more memory needs to be available for the accelerator devices to access and to allow for more fluid operations between individual accelerator devices. Presently, compute devices with one or more accelerator devices contain memory devices that are local to the accelerator devices on the compute device, and are inaccessible to other accelerator devices. That is, a memory device is only utilized by a single accelerator device coupled to the memory device within the compute device.

The implementation of the memory devices among the individual accelerator devices described above leads to difficulty in spreading workloads (e.g., applications, processes, etc.) across multiple accelerator devices, as any data sets to be operated on are only accessible to a single accelerator device. As such, for data centers that include many accelerator devices, a large number of the accelerator devices may be unused at any given time, as they are unable to share in the execution of a workload with other accelerator devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
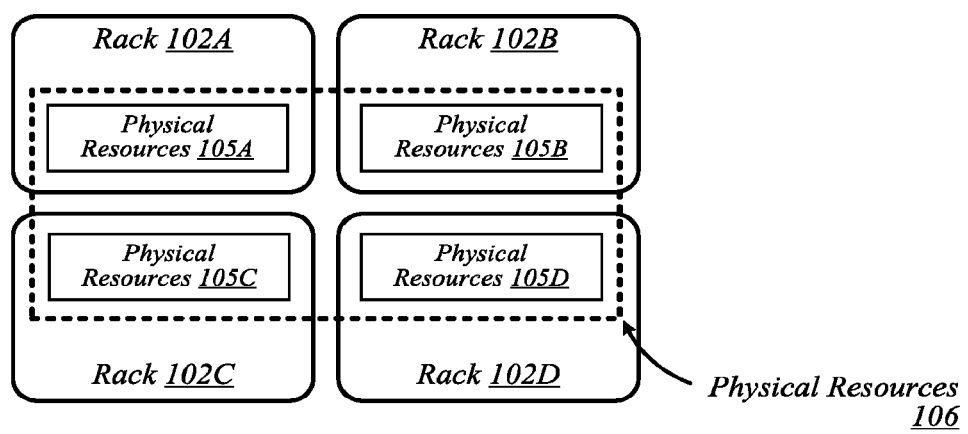
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
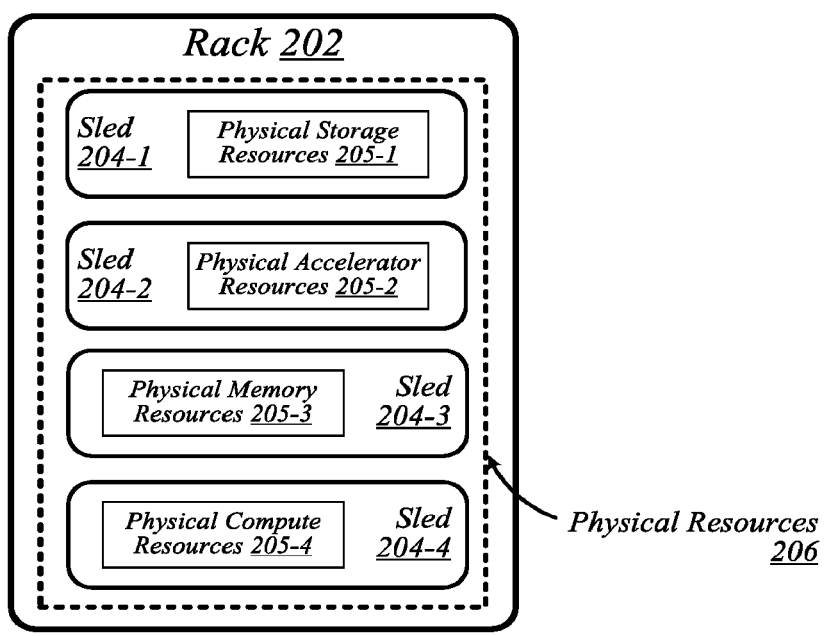
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
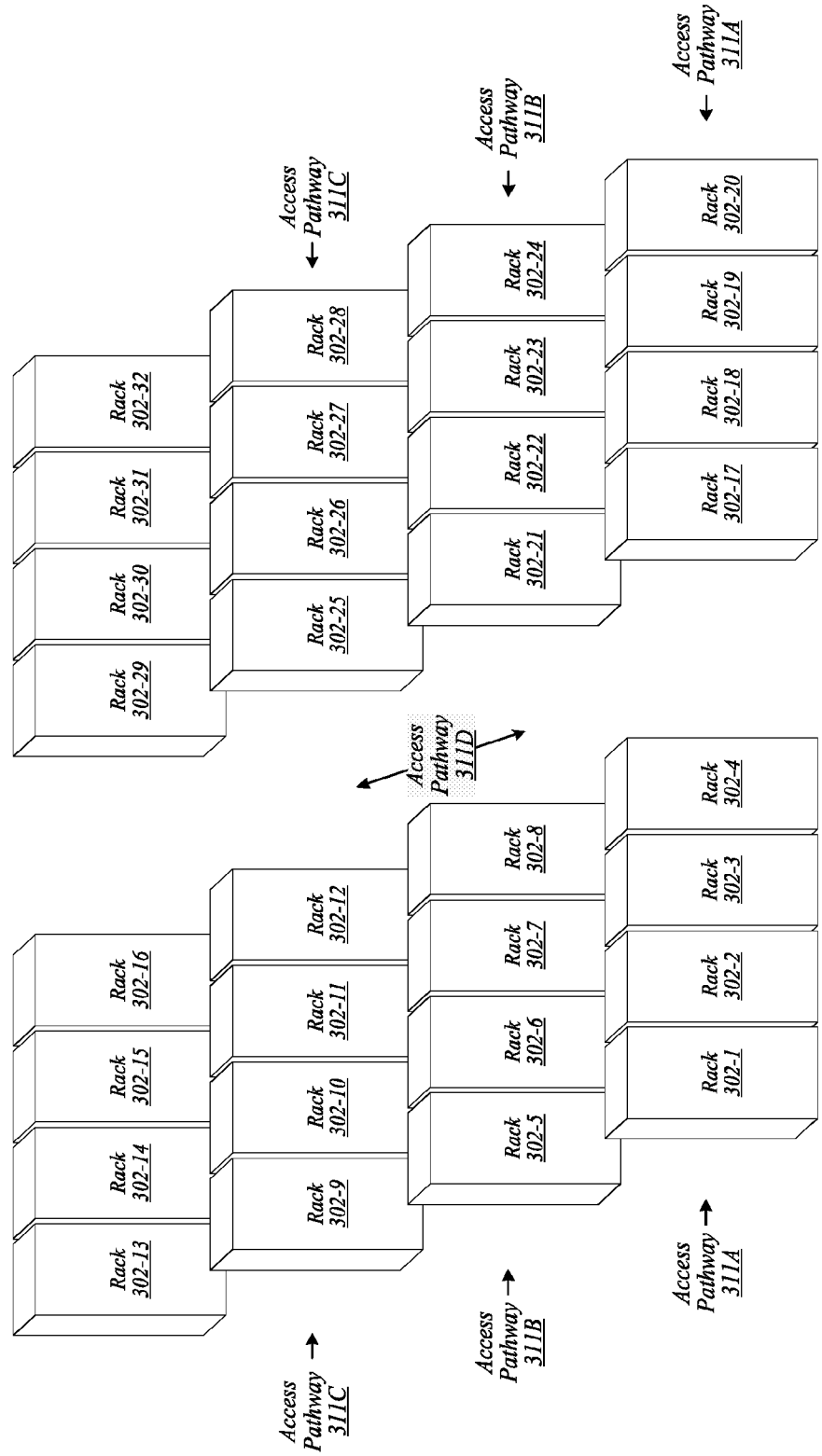
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
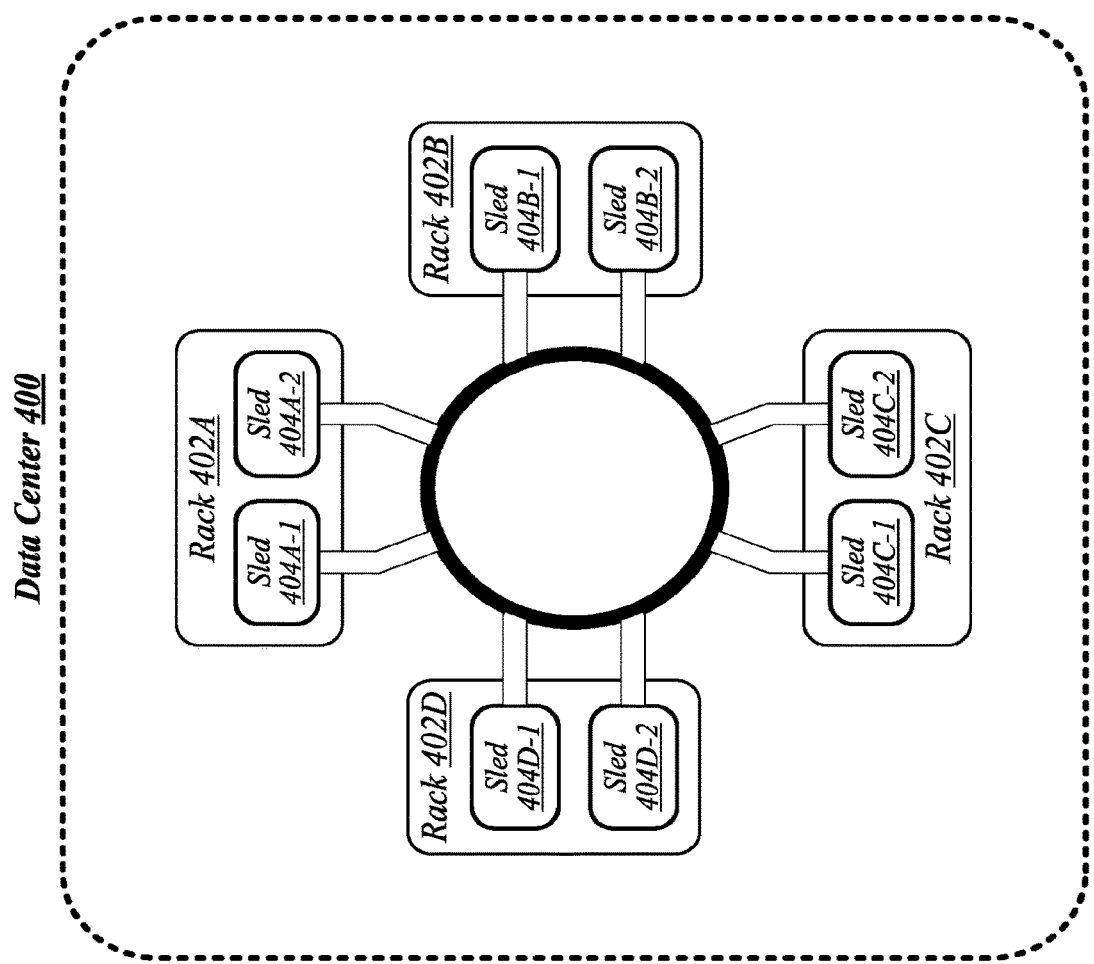
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
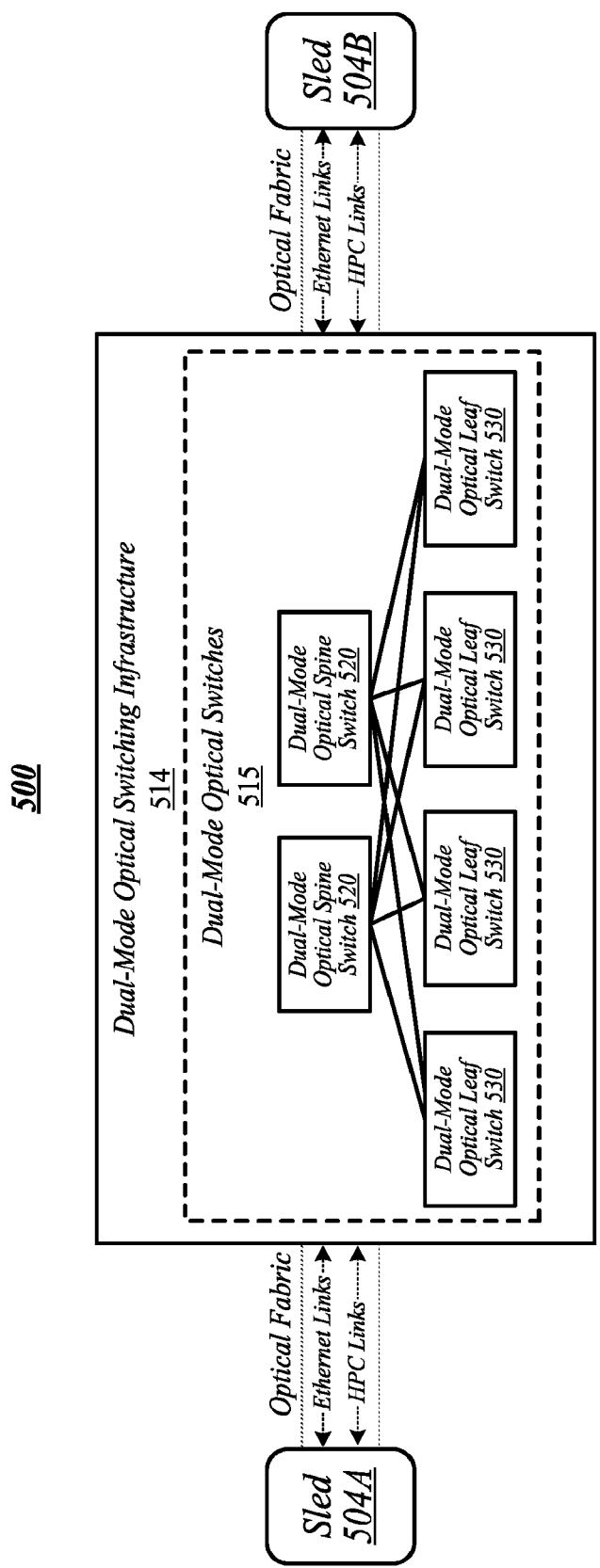
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
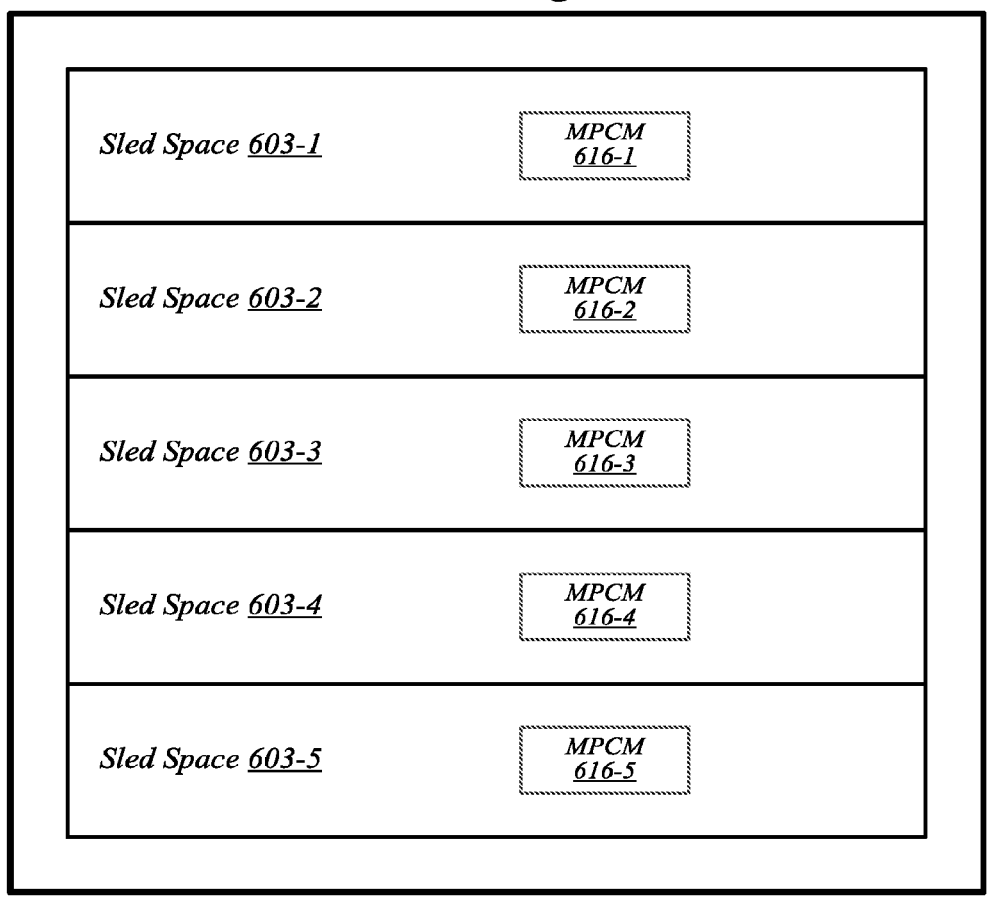
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
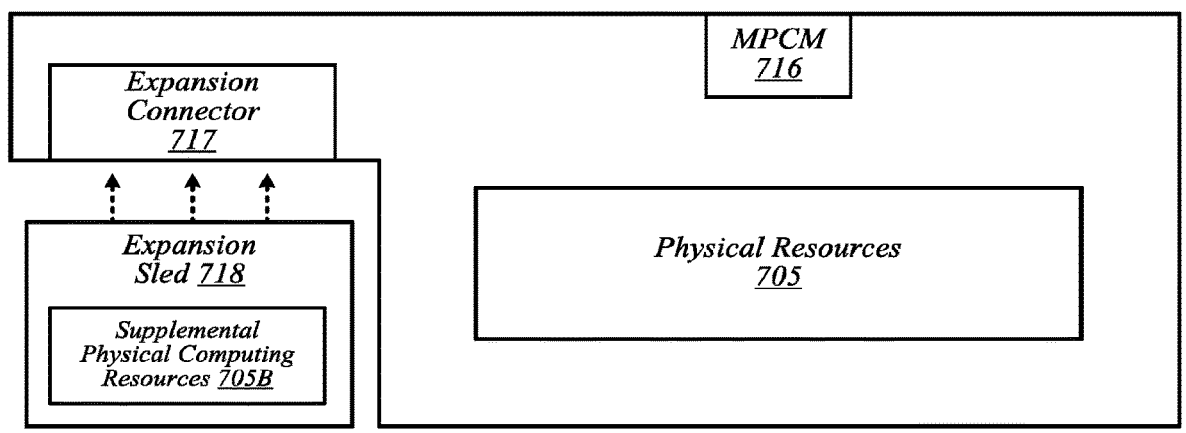
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
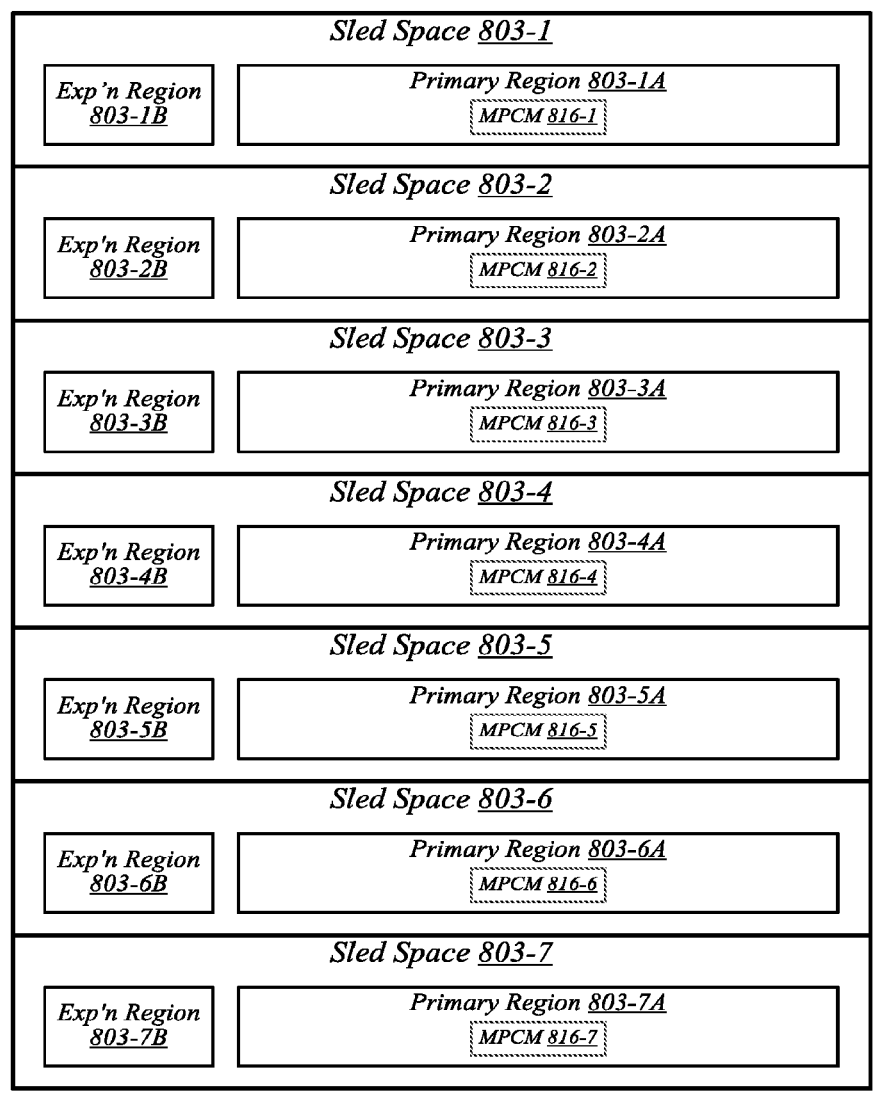
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
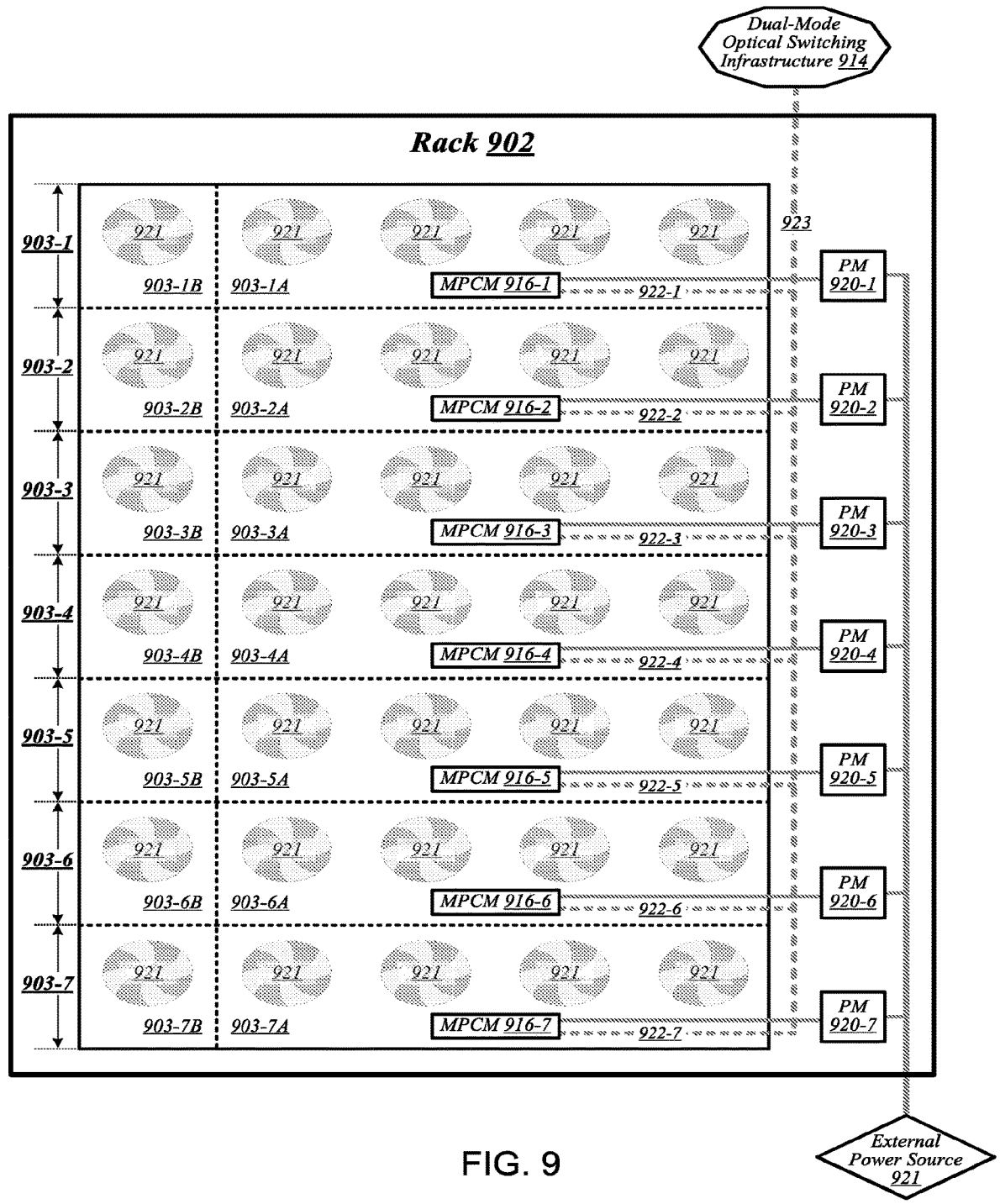
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
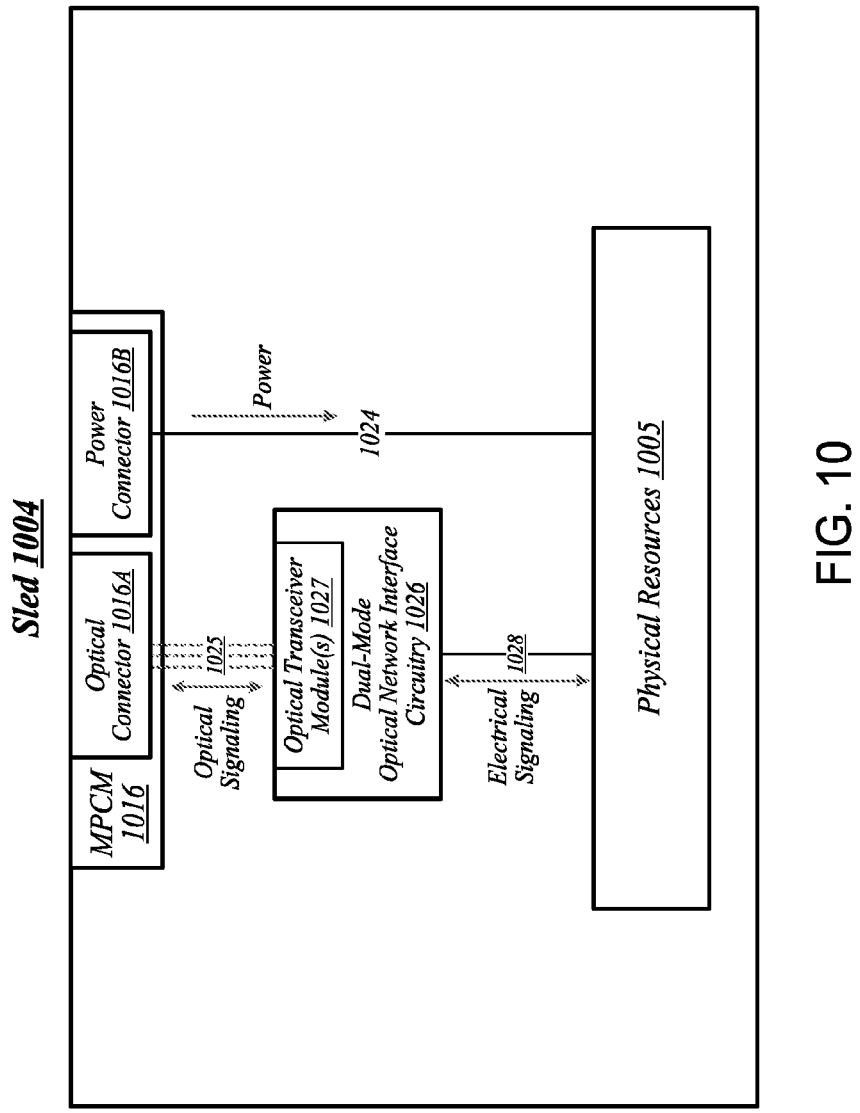
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
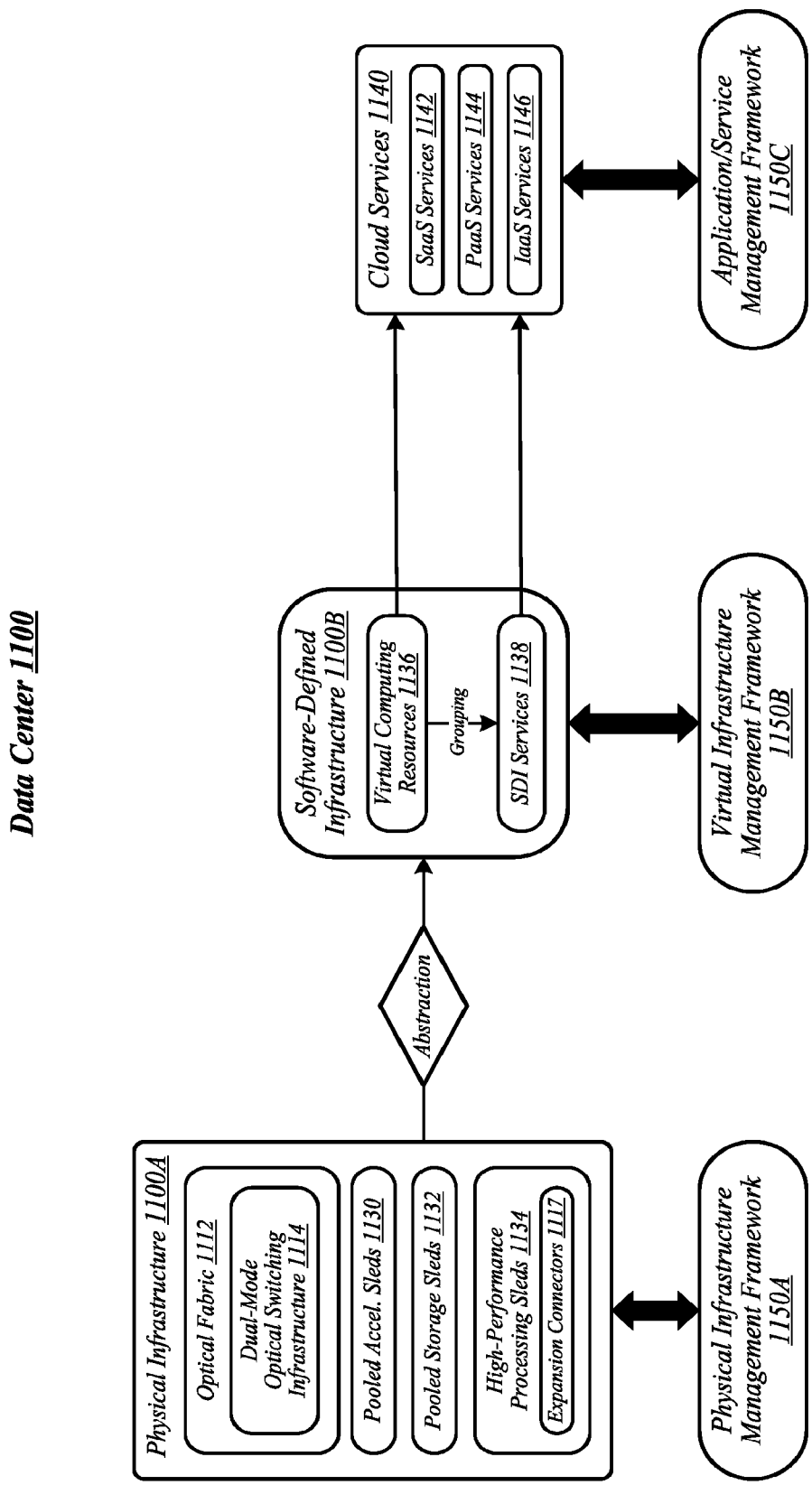
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
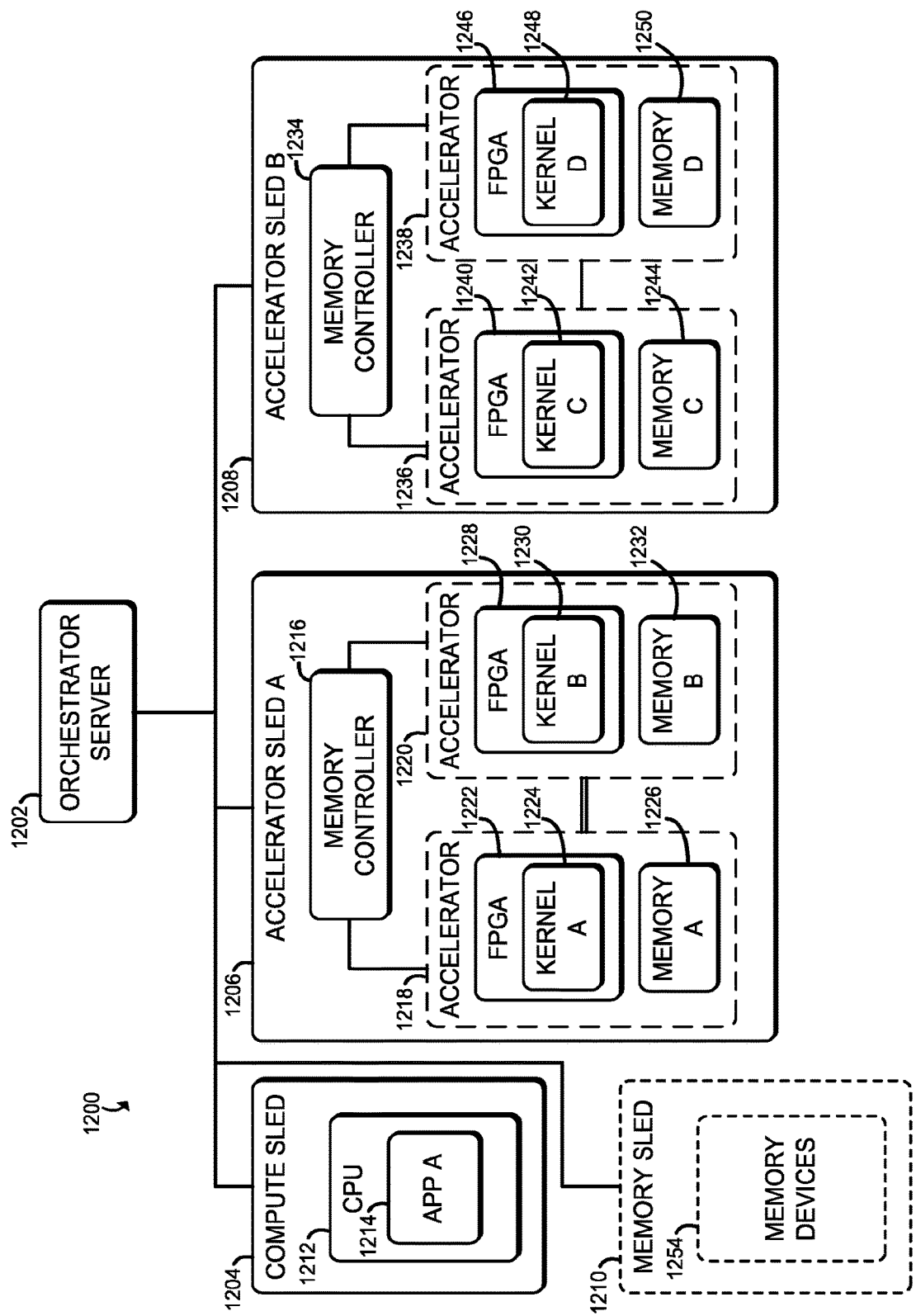
FIG. 12 is a simplified block diagram of at least one embodiment of a system for sharing virtual memory among accelerator sleds.

Referring now to FIG. 12, a system 1200 for sharing virtual memory within an accelerator sled may be implemented in accordance with the data centers 100, 300, 400, 1100 described above with reference to FIGS. 1, 3, 4, and 11. In the illustrative embodiment, sharing virtual memory within an accelerator sled may mean an accelerator device accessing a pool of memory resources, where the pool of memory resources is generated through a virtual mapping of physical addresses to be utilized by accelerator sleds in the system 1200. As such, memory access requests from accelerator sleds are analyzed to determine a physical address from a virtual address identified by the memory access requests, where the physical address is determined based upon an address map that associates a logical or virtual address to a physical address. The accelerator devices are used to accelerate functions of the system. For example, the accelerator devices may be used to accelerate various applications running on compute sleds of the system.

In the illustrative embodiment, the system 1200 includes an orchestrator server 1202 in communication with a compute sled 1204, an accelerator sled A 1206, and an accelerator sled B 1208. Although only one compute sled and two accelerator sleds are shown, there may be any number of compute sleds and/or accelerator sleds utilized in the system 1200. In some embodiments, the system 1200 may include a memory sled 1210 in communication with the orchestrator server 1202 and the other components (e.g., the sleds 1204, 1206, 1208) of the system 1200. One or more of the sleds 1204, 1206, 1208, 1210 may be grouped into a managed node, such as by the orchestrator server 1202, to collectively perform a workload, such as an application. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1202 at the time a workload is to be assigned to the managed node or at any other time, and may exist regardless of whether any workloads are presently assigned to the managed node. The system 1200 may be located in a data center and provide storage and compute services (e.g., cloud services) to a client device (not shown) that is in communication with the system 1200 through a network (not shown). The orchestrator server 1202 may support a cloud operating environment, such as OpenStack, and managed nodes established by the orchestrator server 1202 may execute one or more applications or processes (i.e., workloads), such as in virtual machines or containers, on behalf of a user of the client device. In the illustrative embodiment, the compute sled 1204 utilizes a central processing unit (CPU) 1212 to execute a workload 1214 (e.g., an application). Additionally, the accelerator sled A 1206 includes a memory controller 1216, which may be embodied as any device or circuitry capable of routing memory access requests according to a memory map. The accelerator sled A 1206 also includes one or more accelerator devices 1218, 1220 (e.g., physical accelerator resources 205-2) and the accelerator sled B 1208 also includes a memory controller 1234 and one or more accelerator devices 1236, 1238 (e.g., physical accelerator resources 205-2). Further, each of the accelerator devices 1218, 1220, 1236, 1238, in the illustrative embodiment, includes a field programmable gate array (FPGA) 1222, 1228, 1240, 1246 and a memory 1226, 1232, 1244, 1250, and each of the FPGAs 1222, 1228, 1240, 1246 includes a kernel 1224, 1230, 1242, 1248. In other embodiments, one or more of the accelerator devices 1218, 1220, 1236, 1238, may include other devices or circuitry capable of accelerating the execution of a workload, such an application-specific integrated circuit, a co-processor, etc.

In operation, the system 1200 may utilize one or more kernels 1224, 1230, 1242, 1248 to access a physical memory within the accelerator devices 1218, 1220, 1236, 1238. In the illustrative embodiment, memory 1226, 1232, 1244, 1250 is shared between the accelerator sleds 1206, 1208 based on a mapping of a logical address for each physical address to reference a region of memory. In operation, an accelerator device 1218, 1220, 1236, 1238 may send a memory access request containing a logical address to the memory controller 1216, 1234 to process and determine the physical address associated with the logical address. To do so, the memory controller 1216, 1234 may use an address map as described below. Accordingly, after determination of the physical address, the memory controller 1216, 1234 routes the accelerator device 1218, 1220, 1236, 1238 to the corresponding memory 1226, 1232, 1244, 1250 by sending a notification to the accelerator device 1218, 1220, 1236, 1238 that the logical address is associated with a physical address located in the corresponding memory 1226, 1232, 1244, 1250. This allows the accelerator device 1218, 1220, 1236, 1238 to access the corresponding memory 1226, 1232, 1244, 1250. In some embodiments, the memory controller 1216, 1234 may also route the accelerator devices (e.g., route the memory access requests generated by the accelerator devices) 1218, 1220, 1236, 1238 to a memory device 1254 located on the memory sled 1210.

Figure 13:
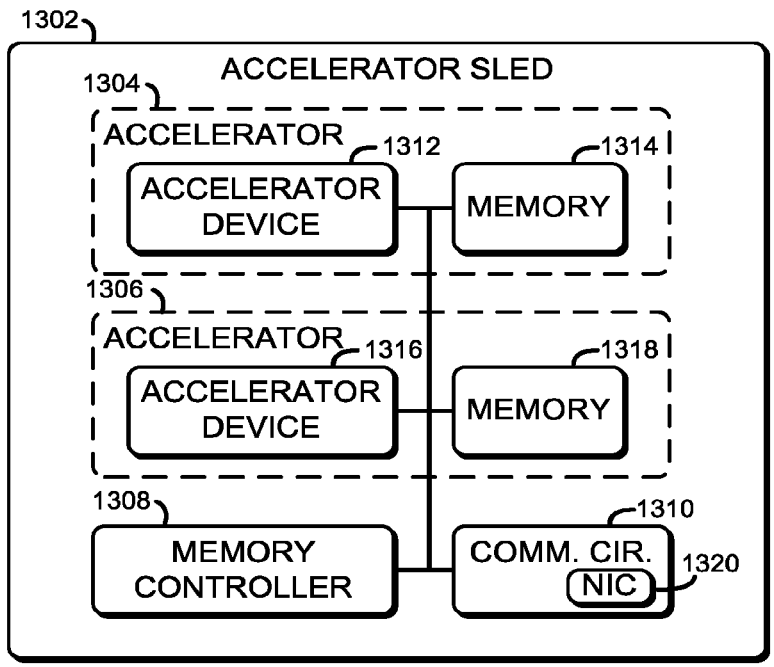
FIG. 13 is a simplified block diagram of at least one embodiment of an accelerator sled of the system of FIG. 12.

Referring now to FIG. 13, one or more of the accelerator sleds 1206, 1208 may be embodied as an accelerator sled 1302 capable of performing the functions described herein, including routing memory access requests among the sleds 1204, 1206, 1208, 1210, and/or the orchestrator server 1202.

As shown in FIG. 13, the illustrative accelerator sled 1302 includes accelerators 1304, 1306, a memory controller 1308, and communication circuitry 1310. In addition, each of the accelerators 1304, 1306 includes an accelerator device 1312, 1316 and a memory 1314, 1318. The communication circuitry includes a network interface controller (NIC) 1320. Of course, in other embodiments, the accelerator sled 1302 may include other or additional components, such as those commonly found in an accelerator sled. Additionally, in some embodiments, one or more of the illustrative components may be incorporated in, or otherwise form a portion of, another component.

The accelerator devices 1312, 1316 may be embodied as any type of device or collection of devices capable of performing various compute functions described below. In some embodiments, each of the accelerator devices 1312, 1316 may be embodied as an FPGA, an application specific integrated circuit (ASIC), reconfigurable hardware or hardware circuitry, or other specialized hardware to facilitate performance of the functions described herein.

The memory 1314, 1318 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance. In operation, the memory 1314, 1318 may store various software and data used during operation such as address map data, memory access request data, key data, applications, programs, libraries, and drivers.

The memory controller 1308 may be embodied as any type of switch capable of performing the functions described herein. In some embodiments, the memory controller 1308 may be embodied as a local memory switch, an inter-FPGA fabric switch, a high speed serial interface (HSSI) switch, a host interface, and/or fabric interface unit (FIU) (e.g., a network interface controller (NIC)).

The communication circuitry 1310 may be embodied as any communication circuit, device, or collection thereof, capable of enabling communications over a network between the compute devices (e.g., the orchestrator server 1202, and/or one or more sleds 1204, 1206, 1208, 1210). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication. The NIC 1320 may similarly be embodied as any communication circuit, device, or collection thereof, capable of enabling communications over a network between the compute devices (e.g., the orchestrator server 1202, and/or one or more sleds 1204, 1206, 1208, 1210).

Figure 14:
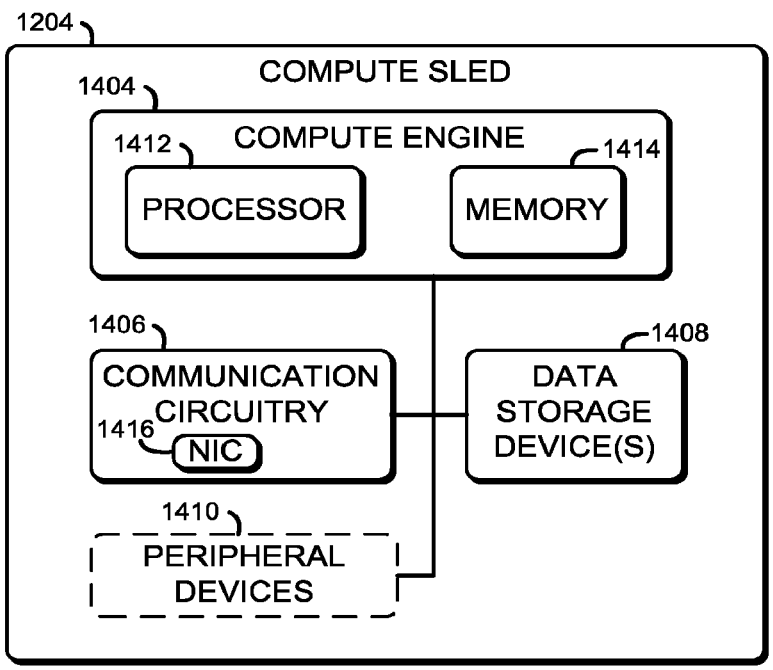
FIG. 14 is a simplified block diagram of at least one embodiment of a compute sled of the system of FIG. 12.

Referring now to FIG. 14, the compute sled 1402, which is similar to the compute sled 1204, may be embodied as any type of compute device capable of performing the functions described herein, including executing a workload 1214. As shown in FIG. 14, the illustrative compute sled 1402 includes a compute engine 1404, a communication circuitry 1406, and one or more data storage devices 1408. In some embodiments, the compute sled 1402 may include peripheral devices 1410. Of course, in other embodiments, the compute sled 1402 may include other or additional components, such as those commonly found in a compute sled. Additionally, in some embodiments, one or more of the illustrative components may be incorporated in, or otherwise form a portion of, another component.

The compute engine 1404 may be embodied as any type of device or collection of devices capable of performing various compute functions described below. In some embodiments, the compute engine 1404 may be embodied as a single device such as an integrated circuit, an embedded system, a field-programmable gate array (FPGA), a system-on-a-chip (SOC), or other integrated system or device. Additionally, in some embodiments, the compute engine 1404 includes or is embodied as a processor 1412 and a memory 1414. The processor 1412 may be embodied as any type of processor capable of performing the functions described herein. For example, the processor 1412 may be embodied as a single or multi-core processor(s), a microcontroller, or other processor or processing/controlling circuit. In some embodiments, the processor 1412 may be embodied as, include, or be coupled to an FPGA, an application specific integrated circuit (ASIC), reconfigurable hardware or hardware circuitry, or other specialized hardware to facilitate performance of the functions described herein.

The memory 1414 may be embodied as any type of volatile (e.g., dynamic random access memory (DRAM), etc.) or non-volatile memory or data storage capable of performing the functions described herein similarly to memory 1314, 1318.

The communication circuitry 1406 may be embodied as any communication circuit, device, or collection thereof, capable of enabling communications over a network between the compute devices (e.g., the orchestrator server 1202, and/or one or more sleds 1204, 1206, 1208, 1210). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication. The NIC 1416 may similarly be embodied as any communication circuit, device, or collection thereof, capable of enabling communications over a network between the compute devices (e.g., the orchestrator server 1202, and/or one or more sleds 1204, 1206, 1208, 1210).

As mentioned above, in some embodiments, the compute sled 1402 may include one or more peripheral devices 1410. Such peripheral devices 1410 may include any type of peripheral device commonly found in a compute device such as a display, speakers, a mouse, a keyboard, and/or other input/output devices, interface devices, and/or other peripheral devices.

The orchestrator server 1202 and the memory sled 1210 may have components similar to those described in FIG. 14. The description of those components of the compute sled 1402 is equally applicable to the description of components of the orchestrator server 1202 and the memory sled 1210 and is not repeated herein for clarity of the description. Further, it should be appreciated that the orchestrator server 1202 and the memory sled 1210 may include other components, sub-components, and devices commonly found in a computing device, which are not discussed above in reference to the compute sled 1402 and not discussed herein for clarity of the description.

As described above, the orchestrator server 1202, and the sleds 1204, 1206, 1208, 1210 are illustratively in communication via a network (not shown), which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 15:
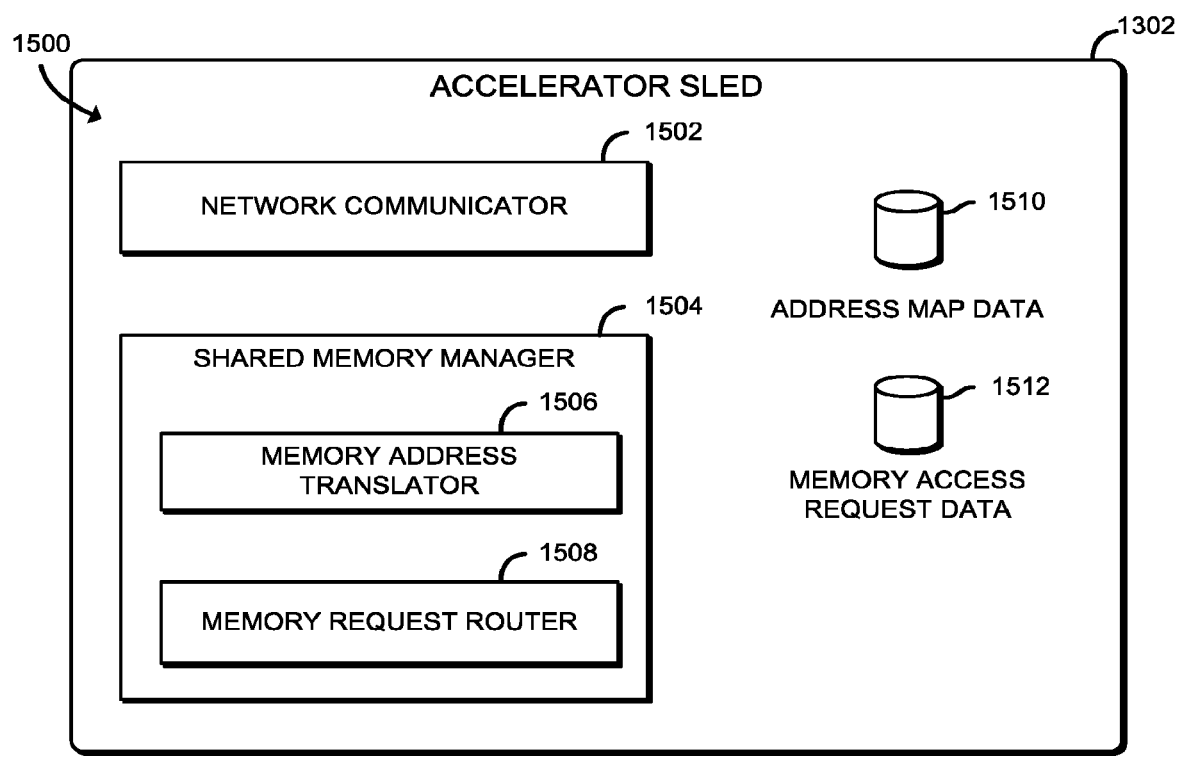
FIG. 15 is a simplified block diagram of at least one embodiment of an environment that may be established by the accelerator sled of FIGS. 12 and 13.

Referring now to FIG. 15, the accelerator sled 1302 may establish an environment 1500 during operation. The accelerator sleds 1206, 1208 and their components may be similarly embodied as the accelerator sled 1302 and establish the environment 1500 during operation. The illustrative environment 1500 includes a network communicator 1502 and a shared memory manager 1504. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1502, shared memory manager circuitry 1504, etc.). It should be appreciated that, in such embodiments, one or more of the network communicator circuitry 1502 or shared memory manager circuitry 1504 may form a portion of one or more of the accelerators 1304, 1306, memory controller 1308, communication circuitry 1310, and/or any other components of the accelerator sled 1302. In the illustrative embodiment, the environment 1500 includes address map data 1510, which may be embodied as any data established by the orchestrator server 1202, compute sled 1204 and/or accelerator sleds 1206, 1208 during the execution of one or more workloads by the sleds 1204, 1206, 1208, 1210 and indicative of the mapping between logical addresses and physical addresses. The address map data 1510 may include information usable to determine a physical address for a logical address identified in a memory access request. That is, a memory pool may be created and stored in the address map data 1510 that contains logical addresses to be referenced by accelerator devices to be directed to a physical address. Additionally, the illustrative environment 1500 includes memory access request data 1512 which may be embodied as any data indicative of the memory access requests received from the various accelerator devices 1218, 1220, 1236, 1238 in the system 1200. The memory access request data 1512 may include information indicative of which accelerator device 1218, 1220, 1236, 1238 requested access to a particular logical address and the corresponding physical access. The memory access request data 1512 may store the logical address and corresponding physical address pairs to be quickly referenced by the accelerator devices 1218, 1220, 1236, 1238.

In the illustrative environment 1500, the network communicator 1502, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the accelerator sled 1302, respectively. To do so, the network communicator 1502 is configured to receive and process data packets from one system or computing device (e.g., a compute sled 1204, an accelerator sled 1206 or 1208, a memory sled 1210, and/or an orchestrator server 1202) and to prepare and send data packets to another computing device or system (e.g., a compute sled 1204, an accelerator sled 1206 or 1208, a memory sled 1210, and/or an orchestrator server 1202). Accordingly, in some embodiments, at least a portion of the functionality of the network communicator 1502 may be performed by the communication circuitry 1310, and, in the illustrative embodiment, by the NIC 1320.

The shared memory manager 1504, which may be embodied as hardware, firmware, software, virtualized hardware, emulated architecture, and/or a combination thereof, is configured to determine a physical address from a logical address that is specified by an accelerator device 1218, 1220, 1236, 1238. In addition, the shared memory manager 1504 identifies whether the logical address is on the local sled, on the requesting accelerator device, or on another sled. To do so, in the illustrative embodiment, the shared memory manager 1504 includes a memory address translator 1506 and a memory request router 1508. The memory address translator 1506, in the illustrative embodiment, is configured to use the address map data 1510 to determine a physical address from a logical address by matching the logical address to a corresponding physical address stored in the address map data 1510. The memory address translator 1506 is further configured to update the address map data 1510 in response to receiving a notification from a host or compute sled 1204 and/or the orchestrator server 1202. This may occur, for example, when any memory devices are added or removed from the system 1200.

The memory request router 1508, in the illustrative embodiment, is configured to receive memory access requests (e.g. read/write to a logical address) from the accelerator devices and route the memory access requests to a physical address, which may be on another accelerator device, accelerator sled, or local memory. In the instance that the physical address is in local memory, the memory request router 1508 may notify the requesting accelerator device where to request the memory from. The memory request router 1508 may communicate with the network communicator 1502 and the memory address translator 1506 to retrieve the physical address associated with a logical address and may communicate that to the requesting accelerator device.

Figure 16:
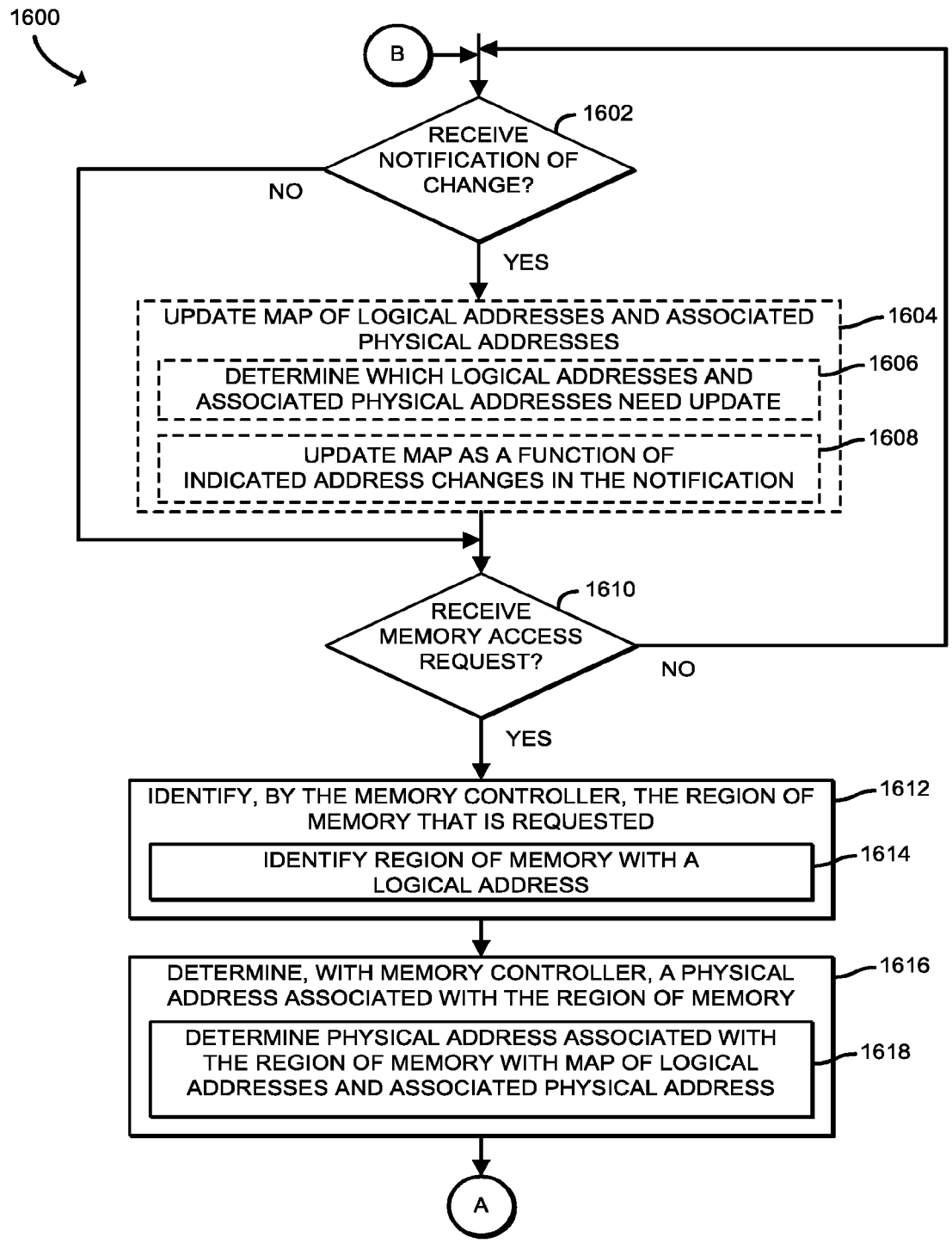
FIGS. 16-17 are a simplified flow diagram of at least one embodiment of a method for sharing virtual memory that may be performed by the accelerator sled of FIGS. 12 and 13.

Referring now to FIG. 16, in use, an accelerator sled 1302 may execute a method 1600 for sharing virtual memory within a system that includes one or more accelerator sleds (e.g., the accelerator sleds 1206, 1208 in the system 1200). For simplicity, the method 1600 is described below as being performed by the accelerator sled 1302. However, it should be understood that in other embodiments, the method 1600 may be performed by one or more other devices (e.g. sleds 1204, 1206, 1208, 1210, and/or orchestrator server 1202).

The method 1600 begins with block 1602 in which the accelerator sled 1302 determines whether a notification of change in the address map has been received. In the illustrative embodiment, the accelerator sled 1302 may receive notifications of changes in the address map from the orchestrator server 1202 and/or a compute sled 1204. Furthermore, the notification of change is to update any changes of logical address associations with physical addresses in the instance that additional memory devices are added or a memory device is removed from the system 1200. If the accelerator sled 1302 receives a notification of change, then the method 1600 advances to block 1604, in which in some embodiments, the accelerator sled 1302 updates a map of logical addresses and the associated physical addresses (e.g., the address map data 1510). However, if there is no notification of change, the method 1600 branches ahead to block 1610, in which the accelerator sled 1302 determines whether a memory access request has been received, as described in more detail herein. However, referring back to block 1604, in updating the address map data 1510, the accelerator sled 1302 may determine which logical addresses and associated physical addresses need updating (e.g., the logical addresses and associated physical addresses referenced in the received notification), as indicated in block 1606. After the determination of which addresses need updating, the method 1600 advances to block 1608 in which the accelerator sled 1302 updates a map as a function of the indicated change (e.g., the modified memory addresses).

In block 1610, the accelerator sled 1302 determines whether a memory access request has been received from an accelerator device. The memory access request may be embodied as a request to read from or write to a logical address, as described above. If the accelerator sled 1302 determines that a memory access request has not been received from an accelerator device, the method 1600 returns to block 1602 to determine if a notification of change has been received. However, when the accelerator sled 1302 receives a memory access request, the method 1600 advances to block 1612 in which the accelerator sled 1302 identifies, by a memory controller 1308, the region of memory that is requested. In addition, in block 1614 the accelerator sled 1302 identifies the region of memory with a logical address that is specified in the memory access request. After identifying the region of memory that is requested, the method 1600 advances to block 1616 in which the accelerator sled 1302 determines, with the memory controller 1308, a physical address associated with the region of memory. In order to do so, in the illustrative embodiment, the method 1600 proceeds to block 1618 in which the accelerator sled 1302 determines the physical address associated with the region of memory using a map of logical addresses and associated physical address (e.g., the address map data 1510).

Figure 17:
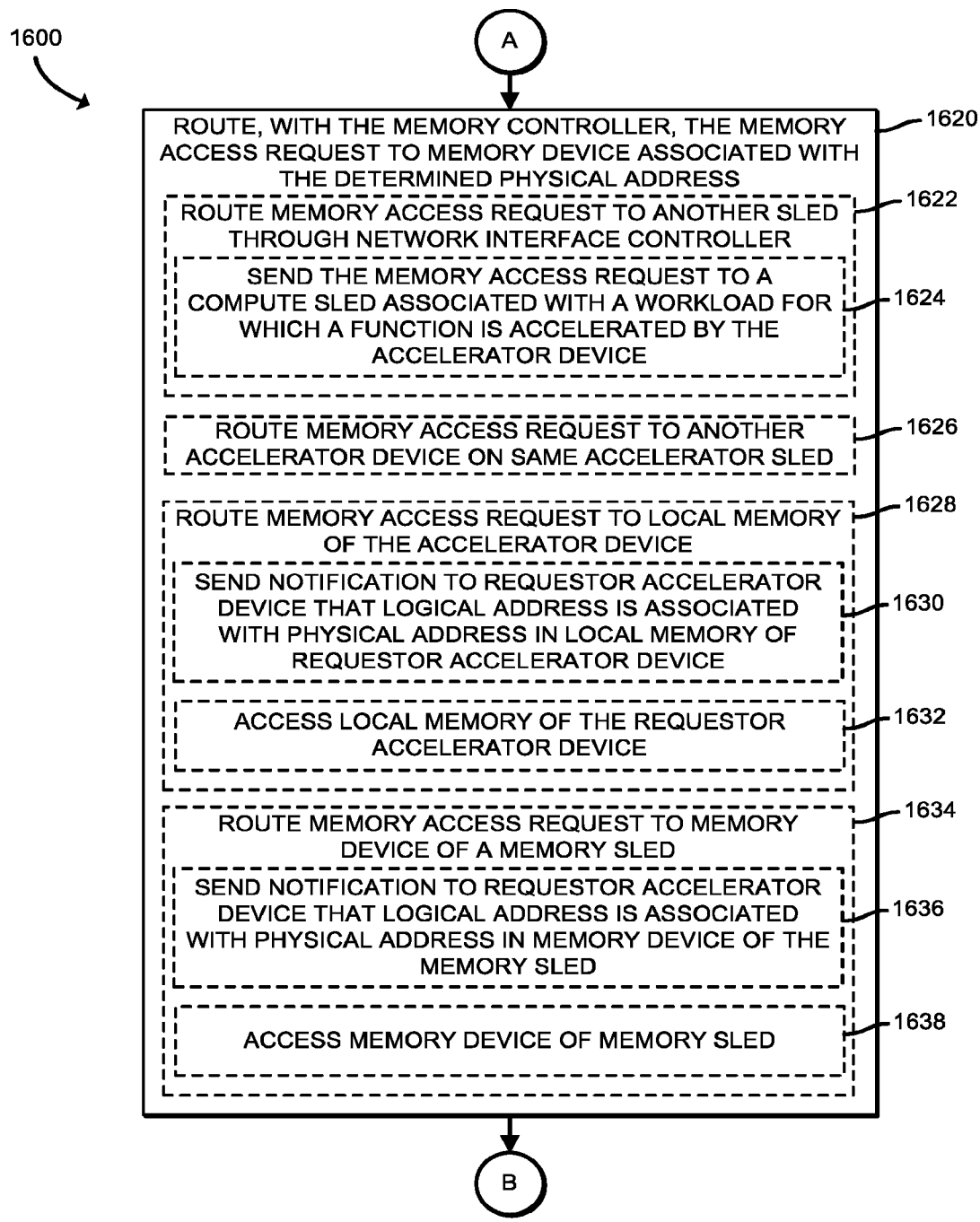

Referring now to FIG. 17, in block 1620, the accelerator sled 1302 subsequently routes, with the memory controller 1308, the memory access request to the memory device associated with the determined physical address. In some embodiments, in block 1622, the accelerator sled 1302 routes the memory access request to another sled through a network interface controller 1320. To route the memory access request to another sled, the method 1600 continues to block 1624 where the accelerator sled 1302 sends the memory access request to a compute sled (e.g., the compute sled 1204) associated with a workload for which a function is accelerated by the accelerator device. In one embodiment, in block 1626, the accelerator sled 1302 routes the memory access request to another accelerator device (e.g., from the accelerator device 1218 to the accelerator device 1220) on the same accelerator sled. In one embodiment, in block 1628, the accelerator sled 1302 routes the memory access request to local memory (e.g., the memory 1226) of the accelerator device (e.g., the accelerator device 1218). In addition, after routing the memory access request to local memory of the accelerator device, in block 1630, the accelerator sled 1302 sends a notification to the requestor accelerator device that the logical address of the memory access request is associated with a physical address in the local memory of the requestor accelerator device. Subsequently to sending the notification, in block 1632, the requestor accelerator device accesses the local memory of the requestor accelerator device. In one embodiment, in block 1634, the accelerator sled 1302 routes the memory access request to a memory device (e.g., the memory devices 1254) of a memory sled (e.g., the memory sled 1210). To do so, the method 1600 continues to block 1636 where the accelerator sled 1302 sends a notification to the requestor accelerator device that the logical address is associated with a physical address in a memory device of the memory sled. After sending the notification, in block 1638, the requestor accelerator device accesses the memory device 1254 of the memory sled 1210. After completion of routing the memory access request to a memory device 1254 associated with the determined physical address, the method 1600 returns to block 1602 of FIG. 16 to continue monitoring whether or not a notification for change has been received.

Figure 18:
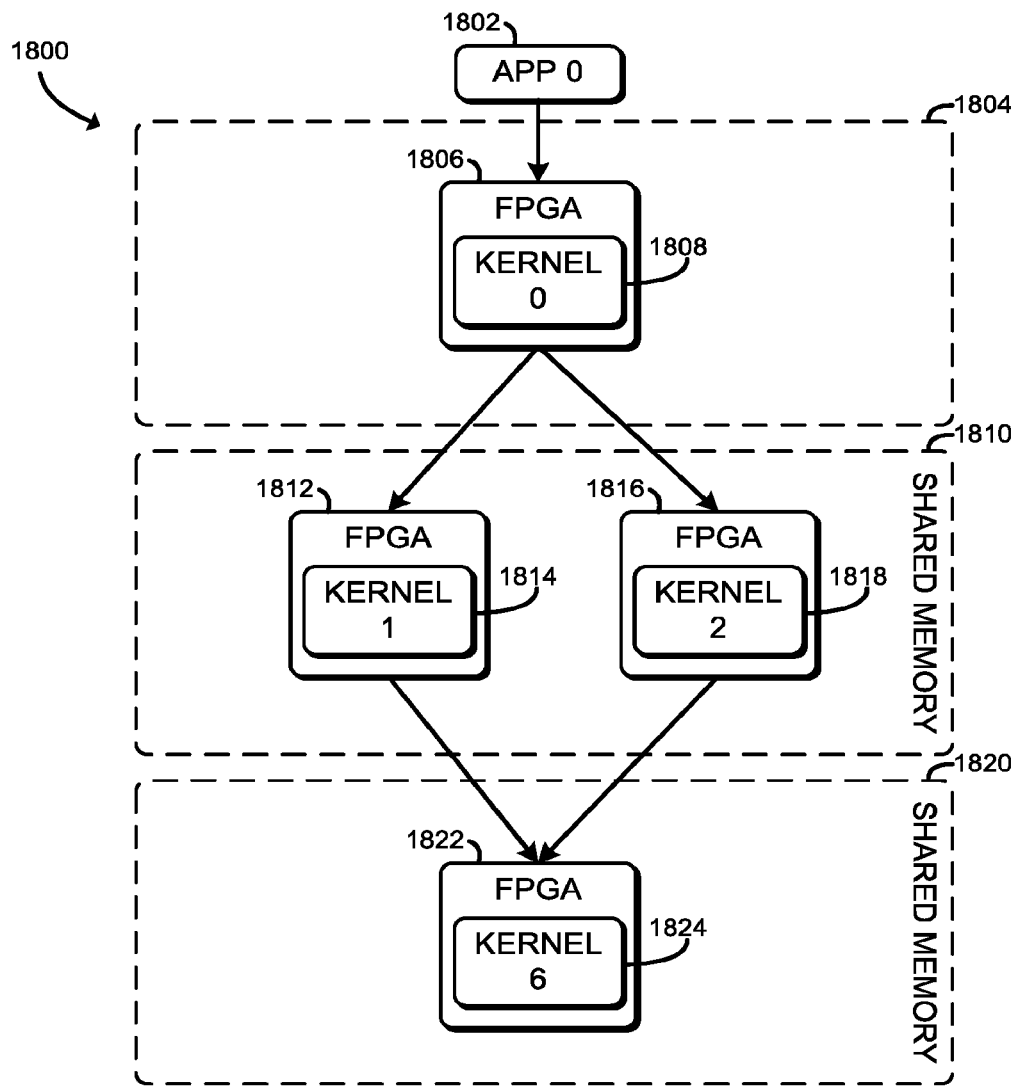
FIG. 18 is an example sharing of virtual memory that may be performed by the system of FIG. 12.

Referring now to FIG. 18, an illustrative virtual topology 1800 illustrates connections between a workload 1802 (e.g. application), a local accelerator sled 1804, and shared memory 1810, 1820. The local accelerator sled 1804 includes an accelerator device 1806 embodied as an FPGA that includes a kernel 1808. The shared memory 1810 is provided by two accelerator devices 1812, 1816 (e.g., similar to accelerator devices 1218, 1220) embodied as FPGAs that each include a kernel 1814, 1818 and associated memory devices (e.g., similar to memory 1226, 1232). Additionally, the shared memory 1820 is provided by an accelerator device 1822 (e.g., similar to the accelerator device 1236) that includes an FPGA that includes a kernel 1824, and an associated memory device (e.g., similar to the memory 1244). The kernels 1808, 1814, 1818, 1824 may request access to region of the shared memory 1810, 1820 through sending a memory access request to their corresponding memory controller 1308 in accordance with the method 1500 described above.

Figure 19:
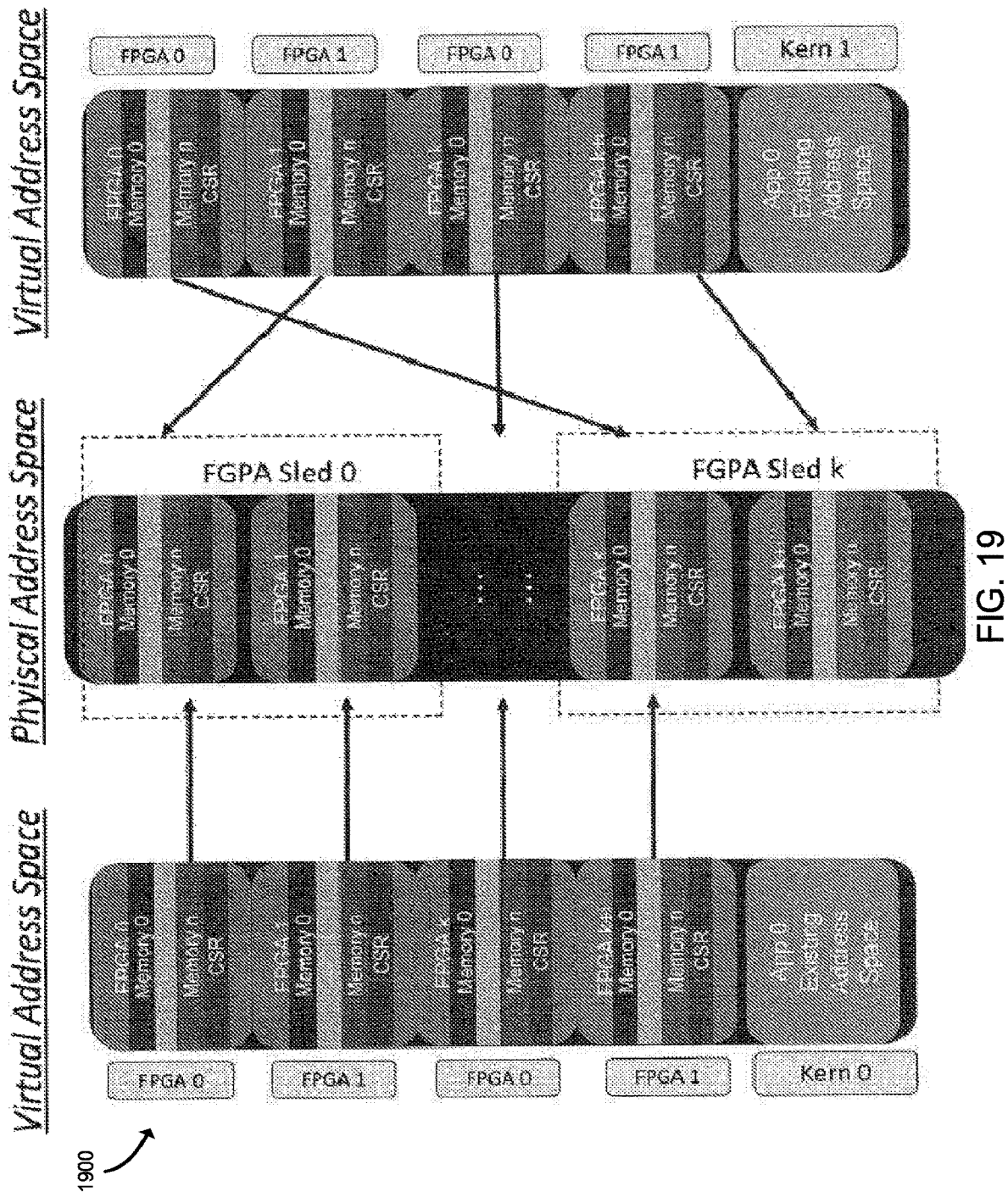
FIG. 19 is an example virtual address mapping to physical addresses that may be performed by the system of FIG. 12.

Referring now to FIG. 19, an illustrative address map 1900 shows virtual address (e.g., logical address) space of multiple FPGAs mapped to a physical address space, shown in the center of FIG. 19. The virtual address space for an FPGA may be directly associated with a physical address space for the FPGA (e.g., in the memory device directly connected to the FPGA) or the virtual address space may be mapped to a physical address space corresponding to a memory device that is local to a different FPGA. In some embodiments, the different kernels that are registered in the same FPGA or different FPGAs may have different virtual to physical mappings.

Figure 20:
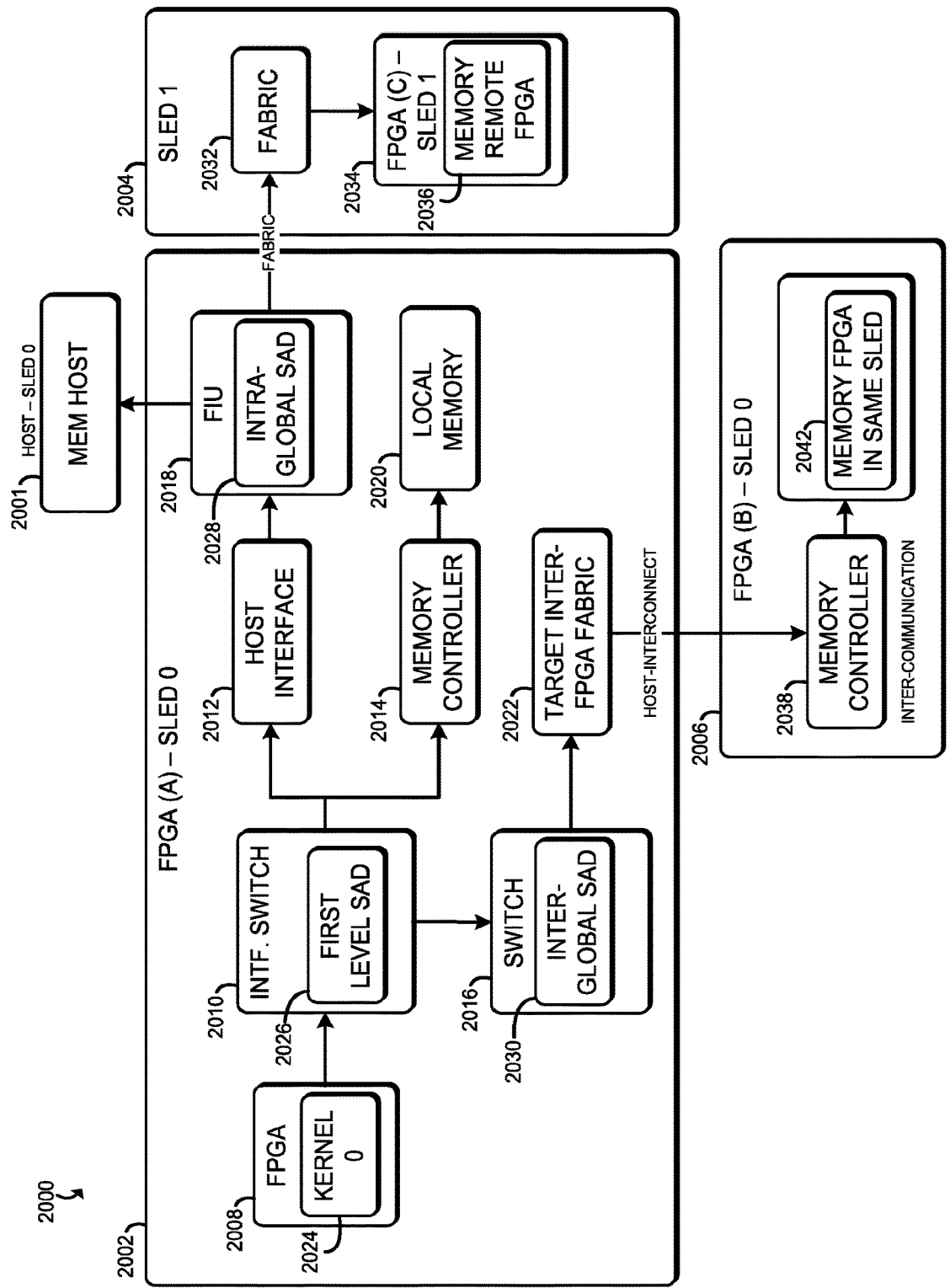
FIG. 20 is simplified block diagram of another embodiment of a system for sharing virtual memory within an accelerator sled.

Referring now to FIG. 20, an illustrative system 2000 includes similar components to the system 1200 and functions similarly to the system 1200. The system 2000 includes a memory host 2001, an FPGA (A) 2002 on sled 0, sled 1 2004, and an FPGA (B) 2006 on sled 0. FPGA (A) includes an FPGA 2008, a switch interface 2010, a host interface 2012, a memory controller 2014, an Inter-FPGA Fabric switch 2016, a fabric interface unit (FIU) 2018, a local memory 2020, and a target Inter-FPGA Fabric 2022. The FPGA 2008 contains a kernel 2024 to request access to memory. The memory access request of kernel 2024 would be sent to the switch interface 2010 which contains a first level system address decoder (SAD) which identifies whether the memory access request is to be redirected to the host interface 2012, the memory controller 2014, or the Inter-FPGA Fabric switch 2016 which contains an inter-global SAD. The host interface 2012 connects to the FIU 2018, which contains an intra-global SAD, which communicates with a memory host 2001 and connects to a sled 1 2004 through fabric 2032 to communicate with FPGA (C) on sled 1 2034, to access memory remote FPGA 2036. The memory controller 2014 connects to the local memory 2020 if the memory access request specifies a logical address that correlates to a physical address on memory. The Inter-FPGA Fabric switch 2016 connects to a target Inter-FPGA Fabric 2022 to connect to a memory controller 2038 of FPGA (B) 2006 in order to access memory 2042 of FPGA (B) 2006 located on the same sled 0 as FPGA (A) 2002.

EXAMPLES

Illustrative examples of the technologies disclosed herein are provided below. An embodiment of the technologies may include any one or more, and any combination of, the examples described below.

Example 1 includes an accelerator sled comprising an accelerator device; a memory controller coupled to the accelerator device; and circuitry to receive, via the memory controller, a memory access request from the accelerator device to access a region of memory, wherein the request identifies the region of memory with a logical address; determine from a map of logical addresses and associated physical address, the physical address associated with the region of memory; and route the memory access request to a memory device associated with the determined physical address, wherein the memory access request includes the determined physical address.

Example 2 includes the subject matter of Example 1, and wherein the circuitry is further to receive a notification from a compute sled indicative of a change to the map of the logical addresses and associated physical addresses; and update the map as a function of the indicated change.

Example 3 includes the subject matter of any of Examples 1 and 2, and wherein the circuitry is further to receive a notification from an orchestrator server indicative of a change to the map of the logical address and associated physical address; and update the map as a function of the indicated change.

Example 4 includes the subject matter of any of Examples 1-3, and wherein to receive the memory access request from the accelerator device comprises to receive the memory access request from a field programmable gate array (FPGA).

Example 5 includes the subject matter of any of Examples 1-4, and wherein to route the memory access request comprises to send, from the memory controller, the memory access request to another sled through a network interface controller on the accelerator sled.

Example 6 includes the subject matter of any of Examples 1-5, and wherein to route the memory access request further comprises to send, from the memory controller, the memory access request to a compute sled associated with a workload for which a function is accelerated by the accelerator device of the accelerator sled.

Example 7 includes the subject matter of any of Examples 1-6, and wherein to route the memory access request comprises to route the memory access request to another accelerator device on the same accelerator sled.

Example 8 includes the subject matter of any of Examples 1-7, and wherein the other accelerator device is a field programmable gate array (FPGA).

Example 9 includes the subject matter of any of Examples 1-8, and wherein to route the memory access request comprises to route the memory access request to a local memory of the accelerator device that sent the request.

Example 10 includes the subject matter of any of Examples 1-9, and wherein to route to the local memory comprises to send, via the memory controller, a notification to the requestor accelerator device that the logical address is associated with the physical address in the local memory of the requestor accelerator device; and access, with the requestor accelerator device, the local memory of the accelerator device.

Example 11 includes the subject matter of any of Examples 1-10, and wherein the accelerator device is an application-specific integrated circuit (ASIC).

Example 12 includes the subject matter of any of Examples 1-11, and wherein to route the memory access request comprises to route the memory access request to a memory device of a memory sled.

Example 13 includes the subject matter of any of Examples 1-12, and wherein to route to the memory device comprises to send, via the memory controller, a notification to the requestor accelerator device that the logical address is associated with the physical address in the memory device of the memory sled; and access, with the requestor accelerator device, the memory device of the memory sled.

Example 14 includes a method comprising receiving, by a memory controller coupled to an accelerator device on an accelerator sled, a memory access request from the accelerator device to access a region of memory, wherein the request identifies the region of memory with a logical address; determining from a map of logical addresses and associated physical address, the physical address associated with the region of memory; routing, via the memory controller, the memory access request to a memory device associated with the determined physical address, wherein the memory access request includes the determined physical address.

Example 15 includes the subject matter of Example 14, and further including receiving, from a compute sled, a notification indicative of a change to the map of the logical addresses and associated physical addresses; and updating, by the memory controller, the map as a function of the indicated change.

Example 16 includes the subject matter of any of Examples 14 and 15, and further including receiving, from an orchestrator server, a notification indicative of a change to the map of the logical addresses and associated physical addresses; and updating, by the memory controller, the map as a function of the indicated change.

Example 17 includes the subject matter of any of Examples 14-16, and wherein receiving the memory access request from the accelerator device comprises receiving the memory access request from a field programmable gate array (FPGA).

Example 18 includes the subject matter of any of Examples 14-17, and wherein routing the memory access request comprises sending, from the memory controller, the memory access request to another sled through a network interface controller on the accelerator sled.

Example 19 includes the subject matter of any of Examples 14-18, and wherein routing the memory access request further comprises sending, from the memory controller, the memory access request to a compute sled associated with a workload for which a function is accelerated by the accelerator device of the accelerator sled.

Example 20 includes the subject matter of any of Examples 14-19, and wherein routing the memory access request comprises routing the memory access request to another accelerator device on the same accelerator sled.

Example 21 includes the subject matter of any of Examples 14-20, and wherein the other accelerator device is a field programmable gate array (FPGA).

Example 22 includes the subject matter of any of Examples 14-21, and wherein routing the memory access request comprises routing the memory access request to a local memory of the accelerator device that sent the request.

Example 23 includes the subject matter of any of Examples 14-22, and wherein routing to the local memory comprises sending, via the memory controller, a notification to the requestor accelerator device that the logical address is associated with the physical address in the local memory of the requestor accelerator device; and accessing, with the requestor accelerator device, the local memory of the accelerator device.

Example 24 includes the subject matter of any of Examples 14-23, and wherein the accelerator device is an application-specific integrated circuit (ASIC).

Example 25 includes the subject matter of any of Examples 14-24, and wherein routing the memory access request comprises routing the memory access request to another memory device of a memory sled.

Example 26 includes the subject matter of any of Examples 14-25, wherein routing to the other memory device comprises sending, via the memory controller, a notification to the requestor accelerator device that the logical address is associated with the physical address in the other memory device of the memory sled; and accessing, with the requestor accelerator device, the other memory device of the memory sled Example 27 includes one or more machine-readable storage media comprising a plurality of instructions stored thereon that, in response to being executed, cause an accelerator sled to perform the method of any of Examples 14-26.

Example 28 includes an accelerator sled comprising means for performing the method of any of Examples 14-26.

Example 29 includes an accelerator sled comprising one or more processors; one or more memory devices having stored therein a plurality of instructions that, when executed by the one or more processors, cause the accelerator sled to perform the method of any of Examples 14-26.

Example 30 includes an accelerator sled comprising network communicator circuitry to receive a memory access request from the accelerator device to access a region of memory, wherein the request identifies the region of memory with a logical address; and shared memory manager circuitry to determine, from a map of logical addresses and associated physical address, the physical address associated with the region of memory; and route the memory access request to a memory device associated with the determined physical address, wherein the memory access request includes the determined physical address.

Example 31 includes the subject matter of Example 30, and wherein the network communicator circuitry is further to receive a notification from a compute sled indicative of a change to the map of the logical addresses and associated physical addresses and wherein the shared memory manager circuitry is further to update the map as a function of the indicated change.

Example 32 includes the subject matter of any of Examples 30 and 31, and wherein the network communicator circuitry is further to receive a notification from an orchestrator server indicative of a change to the map of the logical addresses and associated physical addresses and wherein the shared memory manager circuitry is further to update the map as a function of the indicated change.

Example 33 includes the subject matter of any of Examples 30-32, and wherein to receive the memory access request from the accelerator device comprises to receive the memory access request from a field programmable gate array (FPGA).

Example 34 includes the subject matter of any of Examples 30-33, and wherein to route the memory access request comprises to send the memory access request to another sled through a network interface controller on the accelerator sled.

Example 35 includes the subject matter of any of Examples 30-34, and wherein to route the memory access request further comprises to send the memory access request to a compute sled associated with a workload for which a function is accelerated by the accelerator device of the accelerator sled.

Example 36 includes the subject matter of any of Examples 30-35, and wherein to route the memory access request comprises to route the memory access request to another accelerator device on the same accelerator sled.

Example 37 includes the subject matter of any of Examples 30-36, and wherein the other accelerator device is a field programmable gate array (FPGA).

Example 38 includes the subject matter of any of Examples 30-37, and wherein to route the memory access request comprises to route the memory access request to a local memory of the accelerator device that sent the request.

Example 39 includes the subject matter of any of Examples 30-38, and wherein to route to the local memory comprises to send a notification to the requestor accelerator device that the logical address is associated with the physical address in the local memory of the requestor accelerator device; and access the local memory of the accelerator device.

Example 40 includes the subject matter of any of Examples 30-39, and wherein the accelerator device is an application-specific integrated circuit (ASIC).

Example 41 includes the subject matter of any of Examples 30-40, and wherein to route the memory access request comprises to route the memory access request to a memory device of a memory sled.

Example 42 includes the subject matter of any of Examples 30-41, and wherein to route to the memory device comprises to send a notification to the requestor accelerator device that the logical address is associated with the physical address in the memory device of the memory sled; and access the memory device of the memory sled.

Example 43 includes an accelerator sled comprising circuitry for receiving, by a memory controller coupled to an accelerator device on the accelerator sled, a memory access request from the accelerator device to access a region of memory, wherein the request identifies the region of memory with a logical address; means for determining from a map of logical addresses and associated physical addresses, the physical address associated with the region of memory; and circuitry for routing, via the memory controller, the memory access request to a memory device associated with the determined physical address, wherein the memory access request includes the determined physical address.

Example 44 includes the subject matter of Example 43, and wherein the circuitry for receiving the memory access request comprises circuitry for receiving, from a compute sled, a notification indicative of a change to the map of the logical addresses and associated physical addresses and the accelerator sled further comprises circuitry for updating, by the memory controller, the map as a function of the indicated change.

Example 45 includes the subject matter of any of Examples 43 and 44, and wherein the circuitry for receiving the memory access request comprises circuitry for receiving, from an orchestrator server, a notification indicative of a change to the map of the logical addresses and associated physical addresses and the accelerator sled further comprises circuitry for updating, by the memory controller, the map as a function of the indicated change.

Example 46 includes the subject matter of any of Examples 43-45, and wherein the circuitry for receiving the memory access request from the accelerator device comprises circuitry for receiving the memory access request from a field programmable gate array (FPGA).

Example 47 includes the subject matter of any of Examples 43-46, and wherein the circuitry for routing the memory access request comprises circuitry for sending, from the memory controller, the memory access request to another sled through a network interface controller on the accelerator sled.

Example 48 includes the subject matter of any of Examples 43-47, and wherein the circuitry for routing the memory access request further comprises circuitry for sending, from the memory controller, the memory access request to a compute sled associated with a workload for which a function is accelerated by the accelerator device of the accelerator sled.

Example 49 includes the subject matter of any of Examples 43-48, and wherein the circuitry for routing the memory access request comprises circuitry for routing the memory access request to another accelerator device on the same accelerator sled.

Example 50 includes the subject matter of any of Examples 43-49, and wherein the other accelerator device is a field programmable gate array (FPGA).

Example 51 includes the subject matter of any of Examples 43-50, and wherein the circuitry for routing the memory access request comprises circuitry for routing the memory access request to a local memory of the accelerator device that sent the request.

Example 52 includes the subject matter of any of Examples 43-51, and wherein the circuitry for routing to the local memory comprises circuitry for sending, via the memory controller, a notification to the requestor accelerator device that the logical address is associated with the physical address in the local memory of the requestor accelerator device; and circuitry for accessing, with the requestor accelerator device, the local memory of the accelerator device.

Example 53 includes the subject matter of any of Examples 43-52, and wherein the accelerator device is an application-specific integrated circuit (ASIC).

Example 54 includes the subject matter of any of Examples 43-53, and wherein the circuitry for routing the memory access request comprises circuitry for routing the memory access request to another memory device of a memory sled.

Example 55 includes the subject matter of any of Examples 43-54, and wherein the circuitry for routing to the other memory device comprises circuitry for sending, via the memory controller, a notification to the requestor accelerator device that the logical address is associated with the physical address in the other memory device of the memory sled; and circuitry for accessing, with the requestor accelerator device, the other memory device of the memory sled.

The invention claimed is:

1. An accelerator system comprising:
   an accelerator device;
   a memory controller coupled to the accelerator device; and
   circuitry to:
   route, via the memory controller, a memory operation request to a compute system associated with a workload for which a function is accelerated by the accelerator device, the memory operation request received from the accelerator device to access a region of memory, wherein the memory operation request to the compute system identifies the region of memory with a logical address;
   responsive to an ability of the accelerator device to access the region of memory with the logical address based, at least in part, on a map of logical addresses and associated physical addresses of a memory device, translate the logical address to a physical address of the memory device; and
   route, via the memory controller, a memory access request to the memory device, wherein the memory access request to the memory device includes the physical address.

2. The accelerator system of claim 1, wherein the circuitry is further to:
   receive a notification from the compute system indicative of a change to the map of logical addresses and associated physical addresses; and
   update the map based on the indicated change.

3. The accelerator system of claim 1, wherein the circuitry is further to:
   receive a notification from an orchestrator server indicative of a change to the map of logical addresses and associated physical addresses; and
   update the map based on the indicated change.

4. The accelerator system of claim 1, wherein the accelerator device comprises a field programmable gate array (FPGA).

5. The accelerator system of claim 1, wherein the memory device comprises a local memory of the accelerator device.

6. The accelerator system of claim 5, wherein to route the memory access request to the memory device comprises to:
   send, via the memory controller, a notification to the accelerator device that the logical address is associated with the physical address in the local memory of the accelerator device; and
   access, with the accelerator device, the local memory of the accelerator device.

7. The accelerator system of claim 1, wherein the accelerator device is an application-specific integrated circuit (ASIC).

8. The accelerator system of claim 1, wherein the memory device comprises a memory device of a memory system.

9. The accelerator system of claim 8, wherein to route the memory access request to the memory device comprises to:
   send, via the memory controller, a notification to the accelerator device that the logical address is associated with the physical address in the memory device of the memory system; and
   access, with the accelerator device, the memory device of the memory system.

10. One or more non-transitory machine-readable storage media comprising a plurality of instructions stored thereon that, in response to being executed, cause an accelerator system to:
    route, with a memory controller coupled to an accelerator device of the accelerator system, a memory operation request to a compute system associated with a workload for which a function is accelerated by the accelerator device, the memory operation request received from the accelerator device to access a region of memory, wherein the memory operation request to the compute system identifies the region of memory with a logical address;
    responsive to an ability of the accelerator device to access the region of memory with the logical address based, at least in part, on a map of logical addresses and associated physical addresses of a memory device, translate the logical address to a physical address of the memory device; and
    route, via the memory controller, a memory access request to the memory device, wherein the memory access request to the memory device includes the physical address.

11. The one or more non-transitory machine-readable storage media of claim 10, wherein the plurality of instructions, when executed, further cause the accelerator system to:
    receive a notification from the compute system indicative of a change to the map of logical addresses and associated physical addresses; and
    update the map based on the indicated change.

12. The one or more non-transitory machine-readable storage media of claim 10, wherein the plurality of instructions, when executed, further cause the accelerator system to:
    receive a notification from an orchestrator server indicative of a change to the map of logical addresses and associated physical addresses; and
    update the map based on the indicated change.

13. The one or more non-transitory machine-readable storage media of claim 10, wherein the accelerator device comprises a field programmable gate array (FPGA).

14. The one or more non-transitory machine-readable storage media of claim 10, wherein the memory device comprises a local memory of the accelerator device.

15. The one or more non-transitory machine-readable storage media of claim 14, wherein to route the memory access request to the memory device comprises to:
    send, via the memory controller, a notification to the accelerator device that the logical address is associated with the physical address in the local memory of the accelerator device; and
    access, with the accelerator device, the local memory of the accelerator device.

16. The one or more non-transitory machine-readable storage media of claim 10, wherein the memory device comprises a memory device of a memory system.

17. A method comprising:
    routing, by a memory controller coupled to an accelerator device on an accelerator system, a memory operation request to a compute system associated with a workload for which a function is accelerated by the accelerator device, the memory operation request received from the accelerator device to access a region of memory, wherein the memory operation request to the compute system identifies the region of memory with a logical address;

responsive to an ability of the accelerator device to access the region of memory with the logical address based, at least in part, on a map of logical addresses and associated physical addresses of a memory device, translating the logical address to a physical address of the memory device;

routing, via the memory controller, a memory access request to the memory device, wherein the memory access request to the memory device includes the physical address.

18. The method of claim 17, further comprising:
receiving, from the compute system, a notification indicative of a change to the map of logical addresses and associated physical addresses; and
updating the map based on the indicated change.

19. The method of claim 17, further comprising:
receiving, from an orchestrator server, a notification indicative of a change to the map of logical addresses and associated physical addresses; and
updating the map based on the indicated change.

20. The method of claim 17, wherein the accelerator device comprises a field programmable gate array (FPGA).

21. The method of claim 17, the memory device comprises a local memory of the accelerator device, wherein routing the memory access request to the memory device includes:
sending, via the memory controller, a notification to the accelerator device; and
accessing, with the accelerator device, the local memory of the accelerator device.

22. An accelerator device comprising:
a memory controller; and
circuitry to:
route, via the memory controller, a memory operation request to a compute system, wherein the memory operation request to the compute system identifies a region of memory to access with a first address;
responsive to an ability of the accelerator device to access the region of memory with the first address, translate the first address to a second address of a memory device; and
route, via the memory controller, a memory access request to the memory device, wherein the memory access request to the memory device includes the second address of the memory device.

23. The accelerator device of claim 22, wherein the first address is a logical address and the second address is a physical address of the memory device.

24. The accelerator device of claim 23, wherein the ability to access the region of memory with the logical address is based, at least in part, on a map of logical addresses and associated physical addresses of the memory device, the logical address included among the logical addresses in the map.

25. The accelerator device of claim 24, further comprising the circuitry to:
receive a notification from the compute system indicative of a change to the map of logical addresses and associated physical addresses; and
update the map based on the indicated change.

26. The accelerator device of claim 22, wherein the memory device comprises a local memory maintained at the accelerator device.

27. The accelerator device of claim 22, wherein the memory device is attached to the accelerator device.

* * * * *